US010809143B2

(12) United States Patent
Kawamori et al.

(10) Patent No.: US 10,809,143 B2
(45) Date of Patent: Oct. 20, 2020

(54) JET APPARATUS AND METHOD OF EVALUATING JET

(71) Applicant: SUGINO MACHINE LIMITED, Uozu (JP)

(72) Inventors: Yoshiteru Kawamori, Uozu (JP); Toyoaki Mitsue, Uozu (JP)

(73) Assignee: SUGINO MACHINE LIMITED, Uozu, Toyama Prefecture (JP)

( * ) Notice: Subject to any disclaimer, the term of this patent is extended or adjusted under 35 U.S.C. 154(b) by 150 days.

(21) Appl. No.: 16/176,841

(22) Filed: Oct. 31, 2018

(65) Prior Publication Data
US 2019/0162616 A1    May 30, 2019

(30) Foreign Application Priority Data
Nov. 29, 2017  (JP) .................................. 2017-228751

(51) Int. Cl.
*G01L 15/00* (2006.01)
*G01L 5/00* (2006.01)
(Continued)

(52) U.S. Cl.
CPC .............. *G01L 15/00* (2013.01); *B05B 15/18* (2018.02); *B05B 15/50* (2018.02); *G01L 1/18* (2013.01);
(Continued)

(58) Field of Classification Search
CPC ......... G01L 15/00; G01L 5/0052; G01L 1/18; B05B 15/18; B05B 15/50; B05B 13/0431; B05B 12/082
See application file for complete search history.

(56) References Cited

U.S. PATENT DOCUMENTS 10,215,769 B1 * 2/2019  Huettel ............ G01N 35/00693
10,261,004 B2 * 4/2019  Tsuchiya ............... G01L 5/0052
(Continued)

FOREIGN PATENT DOCUMENTS

EP     3239405 A1    11/2017
JP     H2-19545 A    1/1990
(Continued)

OTHER PUBLICATIONS

Extended European Search Report dated Apr. 8, 2019 in a corresponding European patent application No. 18202033.9 (7 pages).
(Continued)

*Primary Examiner* — Freddie Kirkland, III
(74) *Attorney, Agent, or Firm* — United IP Counselors, LLC (57) ABSTRACT

The jet apparatus includes a nozzle having an injection reference position, an impact force distribution measuring body including a measurement reference position corresponding to the injection reference position, and a plurality of impact force detectors arranged in a lattice pattern on a plane, each impact force detector detects an impact force per unit area of the jet, and a control device including a threshold storage unit, an impact force distribution measuring unit measuring an impact force distribution based on the impact force detected by the impact force detectors when the jet collides with the impact force distribution measuring body, an evaluation value extraction unit extracting an evaluation value based on the impact force distribution, and an evaluation unit determining whether or not the nozzle is adaptive based on comparison result of the evaluation value and the threshold.

18 Claims, 6 Drawing Sheets

(51) Int. Cl.
  *G01L 1/18*    (2006.01)
  *B05B 15/18*   (2018.01)
  *B05B 15/50*   (2018.01)
  *B05B 13/04*   (2006.01)
  *B05B 12/08*   (2006.01)

(52) U.S. Cl.
  CPC .......... *G01L 5/0052* (2013.01); *B05B 12/082* (2013.01); *B05B 13/0431* (2013.01)

(56) References Cited

U.S. PATENT DOCUMENTS

| | | | |
|---|---|---|---|
| 10,654,060 B2 * | 5/2020 | Kawamori | G01L 1/00 |
| 2006/0151628 A1 * | 7/2006 | Fekete | F02M 65/005 |
| | | | 239/102.2 |
| 2014/0034747 A1 * | 2/2014 | Wiehoff | F02M 65/00 |
| | | | 239/5 |
| 2015/0039268 A1 * | 2/2015 | Soyama | B05B 15/18 |
| | | | 702/182 |
| 2017/0343456 A1 * | 11/2017 | Tsuchiya | G01M 99/008 |
| 2019/0187173 A1 * | 6/2019 | Haremaki | B08B 3/04 |

FOREIGN PATENT DOCUMENTS

| | | |
|---|---|---|
| JP | 2015-183353 A | 10/2015 |
| JP | 6147623 B2 | 6/2017 |
| JP | 6227496 B2 | 11/2017 |

OTHER PUBLICATIONS

Office Action dated Aug. 28, 2020 in a corresponding Japanese patent application No. 2017-228751 (3 pages).

* cited by examiner

| X | Y | (36) |
|---|---|------|
| -20 | -20 | 0 |
| -20 | -18 | 0 |
| -20 | -16 | 0 |
| ... | ... | ... |
| 0 | 0 | 18 |
| 0 | 2 | 43 |
| 0 | 4 | 25 |
| 0 | 6 | ... |
| ... | ... | ... |
| ... | ... | ... |
| 2 | 2 | 48 |
| ... | ... | ... |

JET APPARATUS AND METHOD OF EVALUATING JET

CROSS-REFERENCE TO RELATED APPLICATIONS

This application claims the benefit of priority to Japanese Patent Application No. 2017-228751, filed on Nov. 29, 2017, the entire contents of which are hereby incorporated by reference.

BACKGROUND

1. Technical Field

The present invention relates to a jet apparatus for measuring an impact force distribution given by a jet and a method for evaluating the jet.

2. Description of the Background

A conventional device for judging whether or not the fluid ejection performance of a nozzle is acceptable by applying the jet to a pressure sensor moving on an imaginary plane, measuring the ejection pressure, and judging whether or not the position of the jet center is within a predetermined range (Japanese Patent Application Laid-Open No. H2-19545).

BRIEF SUMMARY

The object of the present invention is to quickly and accurately measure the impact force distribution given by a jet flow.

The first aspect of the present invention provides a jet apparatus, including:
a nozzle having an injection reference position, the nozzle configured to generate a liquid jet;
an impact force distribution measuring body including
a measurement reference position corresponding to the injection reference position, and
a plurality of impact force detectors arranged in a lattice pattern on a plane, each impact force detector configured to detect an impact force per unit area of the jet; and
a control device including
a threshold storage unit configured to store a threshold,
an impact force distribution measuring unit configured to measure an impact force distribution based on the impact force detected by the impact force detectors when the jet collides with the impact force distribution measuring body,
an evaluation value extraction unit configured to extract an evaluation value based on the impact force distribution, and
an evaluation unit configured to determine whether or not the nozzle is adaptive based on comparison result of the evaluation value and the threshold.

The second aspect of the present invention provides a method of evaluating a jet.

According to the present invention, the impact force distribution given by the jet flow can be quickly and accurately measured.

DETAILED DESCRIPTION

Figure 1:
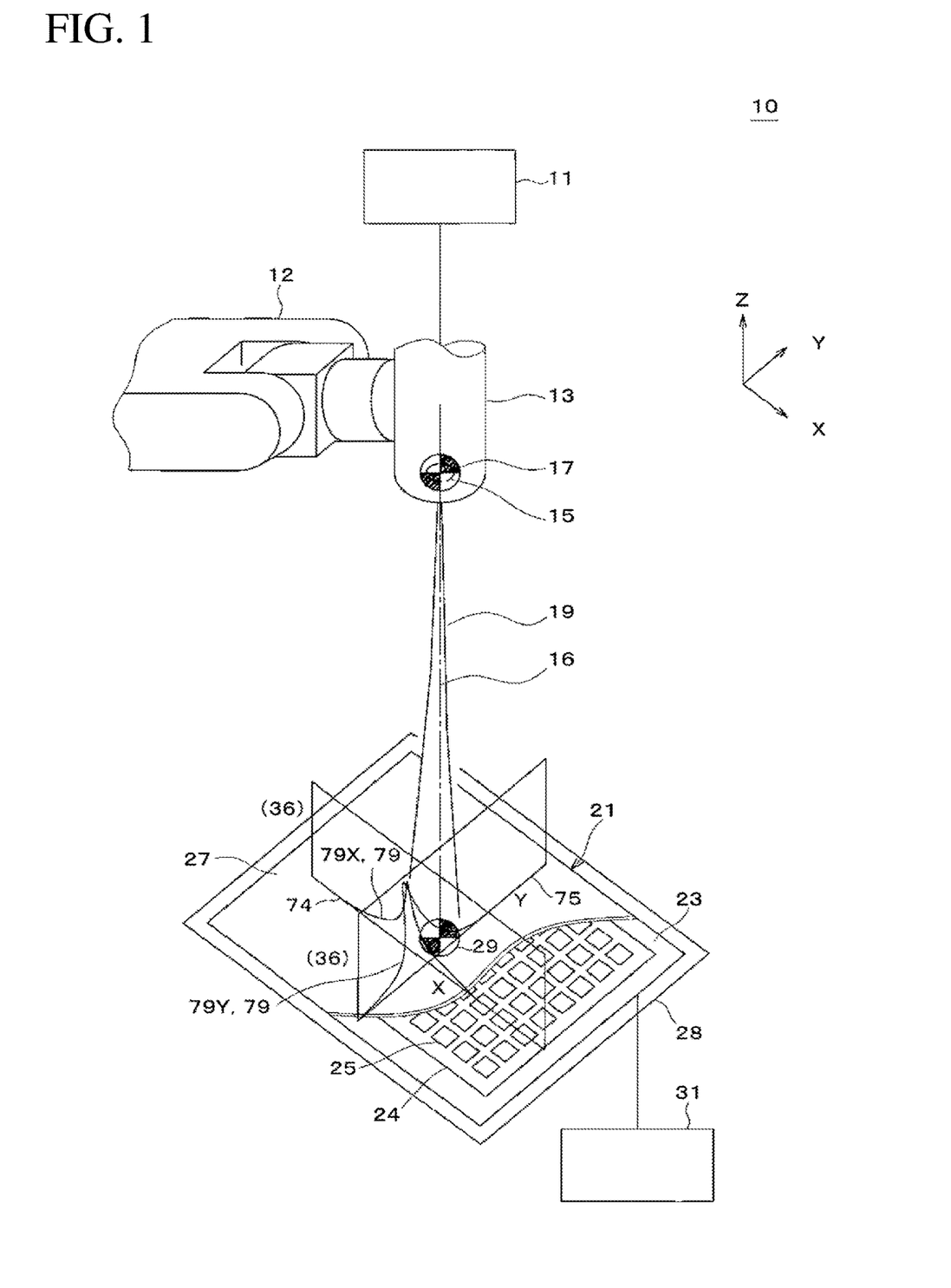
FIG. 1 shows a jetting apparatus according to an embodiment.

The jet apparatus 10 according to an embodiment will be described with reference to FIG. 1. The jet apparatus 10 includes a pressure generator 11, a nozzle 13, an impact force distribution measuring body 21 (hereinafter referred to as "measuring body 21"), and a control device 31.

The pressure generator 11 raises the pressure of the liquid to a high pressure of 10 MPa to 300 MPa. The pressure generator 11 is, for example, a piston pump.

The nozzle 13 has a spout 15. The nozzle 13 is connected to the pressure generator 11. The center position of the spout 15 is defined as an injection reference position 17 (hereinafter referred to as "reference position 17"). The desired injection direction from the nozzle 13 is defined as an axis 16. The nozzle 13 ejects the liquid as a jet flow 19.

The jet apparatus 10 may include a moving mechanism 12. The moving mechanism 12 moves the nozzle 13 relative to the measuring body 21. The moving mechanism 12 is, for example, a vertical articulated robot, a cartesian coordinate robot, a parallel link robot, or a combination of a moving column and a feed base.

In the jet apparatus 10 without the moving mechanism 12, the nozzle 13 is fixed to the reference position 17.

The measuring body 21 includes a substrate 23, a plurality of impact force detectors 25 (hereinafter referred to as "detector 25"), and a protection plate 27. The substrate 23 has a flat surface 24. The substrate 23 has such strength and rigidity as not to be deformed by the jet flow 19.

A large number of detectors 25 are arranged in a lattice pattern on the flat surface 24. The detector 25 is, for example, a piezoelectric element. The detector 25 may be a columnar body in which a strain gauge is disposed on a side surface. Wiring of the detector 25 is provided on the substrate 23. The detector 25 detects an impact force 36 per unit area (hereinafter referred to as "impact force 36") (unit: Pa). The detection range of the detector 25 is appropriately designed in accordance with the intensity of the jet flow 19. For example, the detection range is set to 0 MPa to 50 MPa with respect to the jet flow 19 of the aqueous cleaning liquid generated from the pressure of 20 MPa. The arrangement pitch of the detectors 25 is preferably 0.5 to 3 times the diameter of the spout 15. The detection area of the detector 25 is preferably 50% to 90% of the square of the array pitch.

The protection plate 27 covers the substrate 23 and the plurality of detectors 25. The protection plate 27 has strength and elasticity that withstand the collision of the jet flow 19 and can be elastically deformed when the jet 19 collides with the protection plate 27. The protection plate 27 is, for example, a thin plate metal. A wear-resistant thin film may be provided on the surface of the protection plate 27, that is, on the surface against which the jet flow 19 impinges. The rear surface of the protection plate 27 is in contact with the detector 25. For example, a protection plate 27 made of an austenitic stainless steel plate having a thickness of 0.1 to 0.5 mm is suitable for the jet flow 19 having a pressure of 10 MPa to 100 MPa of a liquid which is a water-based cleaning liquid.

A measurement reference position 29 (hereinafter referred to as "reference position 29") is a reference coordinate of the impact force distribution 37, which is a distribution of the impact force 36. The plurality of detectors 25 are associated with coordinates having the reference position 29 as an origin. For example, the reference position 29 is set at the center of the pressure receiving surface of the detector 25 near the center of the plurality of detectors 25.

The measuring body 21 is fixed in an accurate position and orientation to the reference position 17. That is, the reference position 29 is arranged on the extension of the axis 16 of the nozzle 13 at the reference position 17. The flat surface 24 is fixed perpendicularly to the axis 16. Preferably, the substrate 23 is arranged on a installation plane 28 perpendicular to the axis 16.

In the jet apparatus 10 having the moving mechanism 12, the reference position 17 is determined by the moving mechanism 12 such that the axis 16 is perpendicular to the substrate 23 and the axis 16 passes through the reference position 29.

When the moving mechanism 12 has an orthogonal movement axis, the installation plane 28 is arranged in parallel to the orthogonal movement axis, and the measuring body 21 is arranged on the installation plane 28 in parallel to the orthogonal movement axis. The installation plane 28 can be adjusted and fixed parallel to the orthogonal movement axis.

Figure 2:
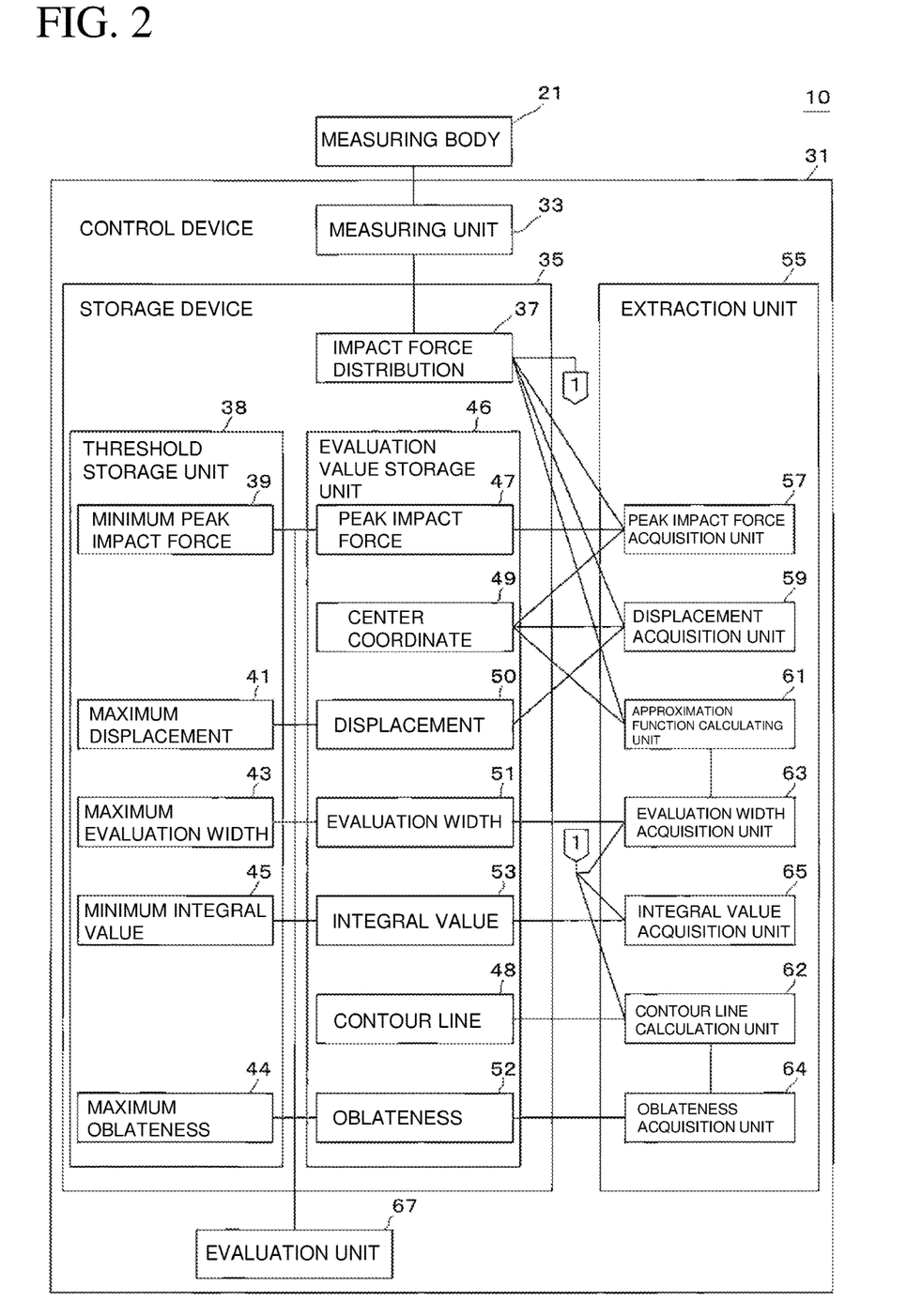
FIG. 2 shows a functional block diagram of the jet apparatus according to the embodiment.

As shown in FIG. 2, the control device 31 includes an impact force distribution measuring unit 33 (hereinafter referred to as "measuring unit 33"), a storage device 35, an evaluation value extraction unit 55 (hereinafter referred to as "extraction unit 55"), and an evaluation unit 67.

The storage device 35 includes a threshold storage unit 38 and an evaluation value storage unit 46. The storage device 35 stores the impact force distribution 37.

The evaluation value storage unit 46 stores the peak impact force 47 and the displacement 50. The evaluation value storage unit 46 may further store a center coordinate 49, an evaluation width 51, an integral value 53, a contour line 48, and a oblateness 52. Here, the peak impact force 47, the center coordinate 49, the displacement 50, the evaluation width 51, the integral value 53, the contour line 48, and the oblateness 52 are collectively referred to as evaluation values.

The threshold storage unit 38 stores a minimum peak impact force 39 and a maximum displacement 41. The threshold storage unit 38 may further store a maximum evaluation width 43, a minimum integral value 45, and a maximum oblateness 44. The minimum peak impact force 39 is the minimum value of the peak impact force 47. The maximum displacement 41 is the maximum value of the displacement 50. The maximum evaluation width 43 is the maximum value of the evaluation width 51. The minimum integral value 45 is the minimum value of the integral value 53. The maximum oblateness 44 is the maximum value of the oblateness 52. The minimum peak impact force 39, the maximum displacement 41, the maximum evaluation width 43, the minimum integral value 45, and the maximum oblateness 44 are collectively referred to as thresholds. The threshold is determined experimentally. When the jet apparatus 10 has a plurality of nozzles 13, or when the jet 19 is generated by a plurality of ejection pressures, the threshold value may be set according to the nozzle 13 and the ejection pressure, respectively.

When the jet apparatus 10 is a high-pressure jet cleaner, the maximum displacement 41 is set to a size that allows the jet 19 to enter the target hole based on the radius of the target hole of the target part and the distance between the nozzle and the target object.

The minimum peak impact force 39 is set at 60-70% of the peak impact force 47 measured by the jet flow 19 from the nozzle 13 prior to use.

The maximum evaluation width 43 is set to 120% to 200% of the evaluation width 51 measured by the jet flow 19 from the nozzle 13 prior to use.

When the nozzle 13 generates a cylindrical jet flow 19, the maximum oblateness 44 is set to 0.5 to 0.7.

The extraction unit 55 includes a peak impact force acquisition unit 57 and a displacement acquisition unit 59. The extraction unit 55 may further include an approximation function calculating unit 61, an evaluation width acquisition unit 63, an integral value acquisition unit 65, a contour line calculation unit 62, and a oblateness acquisition unit 64.

The measuring unit 33 converts a large number of electric signals received from the measuring body 21 into an impact force distribution 37. The measuring unit 33 stores the impact force distribution 37 in the storage device 35.

Figure 3:
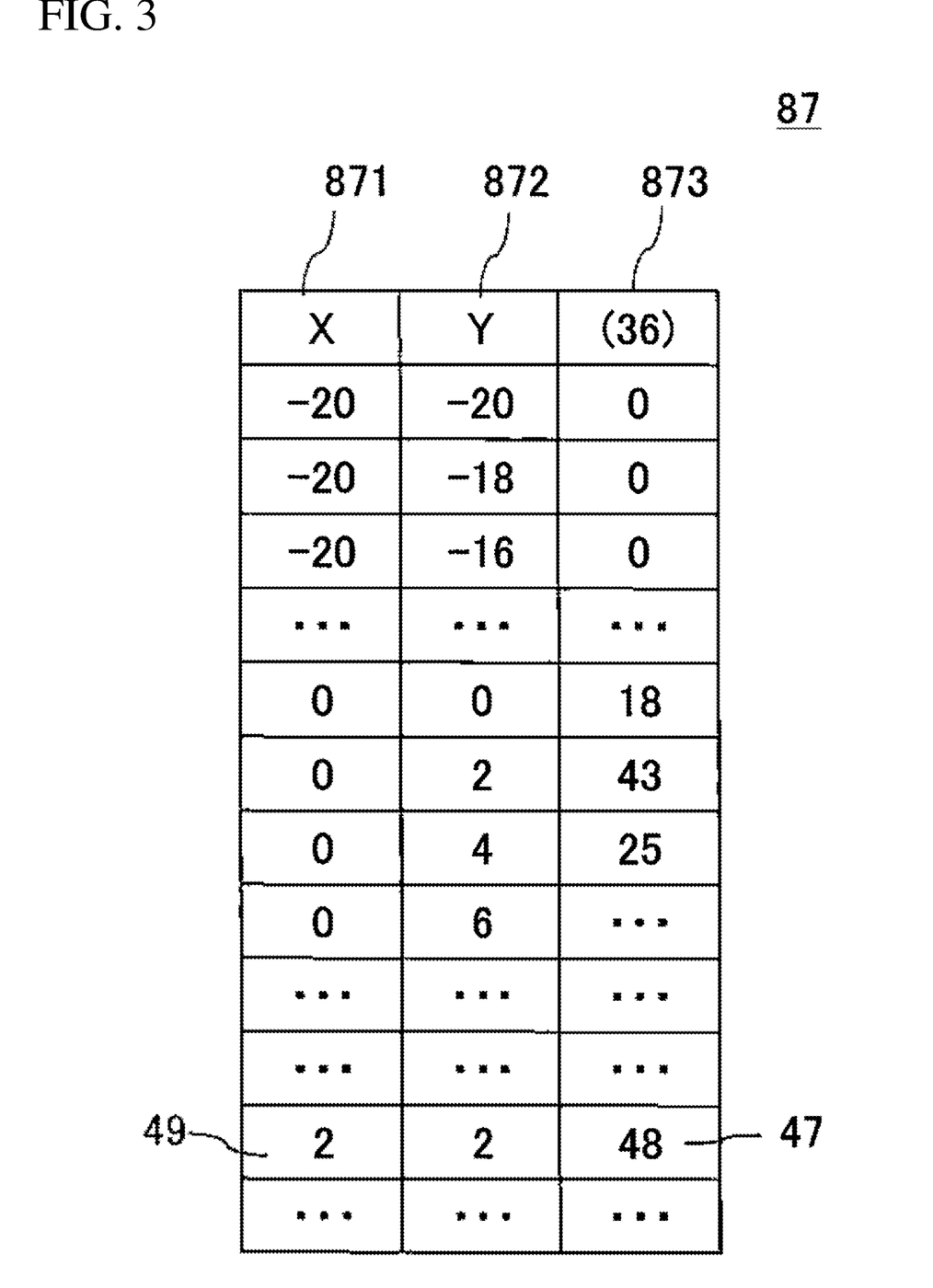
FIG. 3 shows an example of an impact force distribution table according to the embodiment.

As shown in FIG. 3, the impact force distribution 37 may be stored as an impact force distribution table 87 with respect to coordinates having the reference position 29 as an origin. Columns 871 and 872 indicate the X and Y coordinates (in mm) of each cell, respectively. Column 873 shows the impact force 36 detected by each cell.

Figure 4:
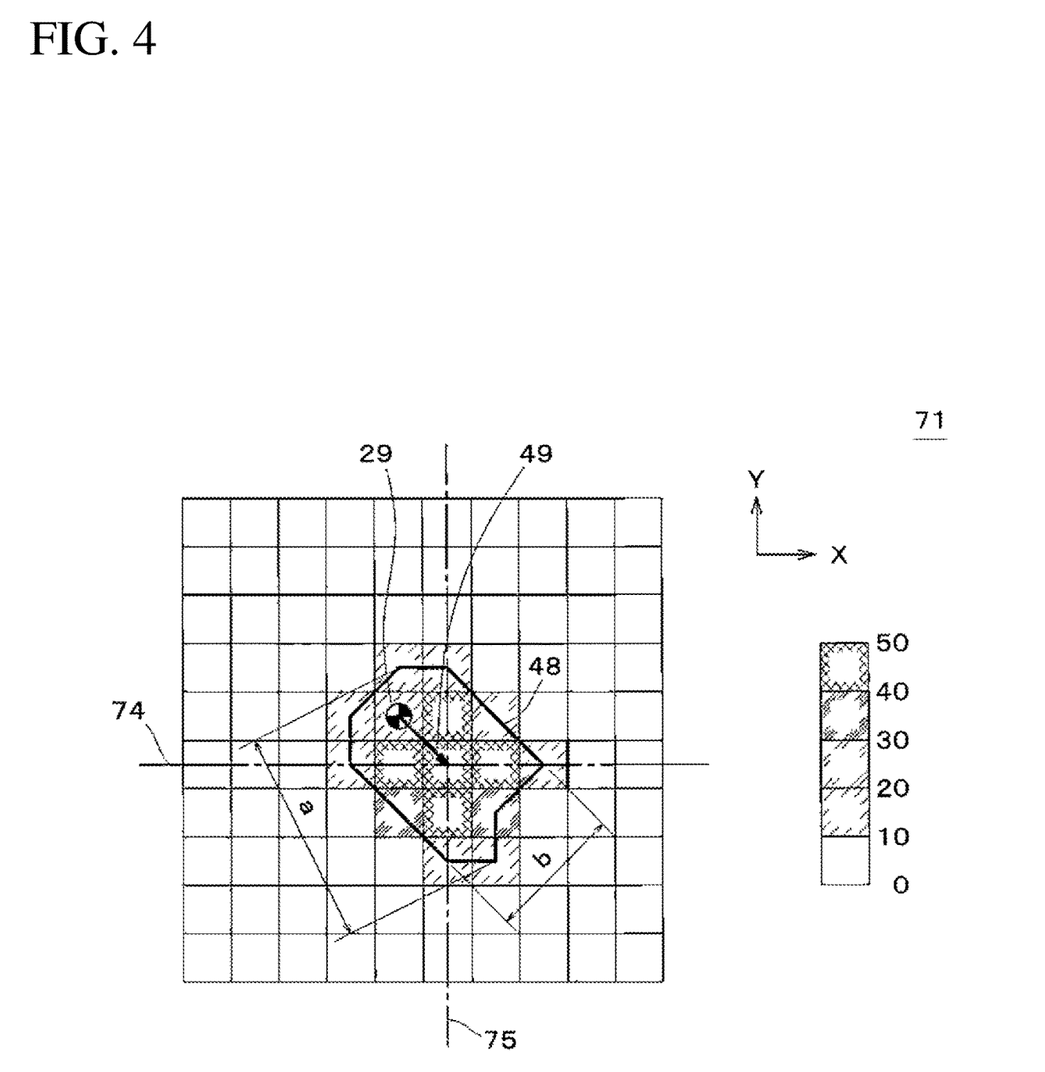
FIG. 4 shows an example of an impact force distribution diagram according to the embodiment.

FIG. 4 is an impact force distribution diagram in which the impact force 36 detected by each detector 25 is color-coded into cells corresponding to the position of the detector 25. As shown in FIG. 2, the peak impact force acquisition unit 57 reads the impact force distribution 37 from the storage device 35, and extracts the peak value of the impact force 36 as the peak impact force 47. The peak impact force acquisition unit 57 stores the peak impact force 47 in the evaluation value storage unit 46.

The displacement acquisition unit 59 reads out the impact force distribution 37, and extracts coordinates on which the peak impact force 47 is stored as the center coordinates 49. Further, the displacement acquisition unit 59 calculates the absolute value (vector length) of the center coordinate 49 as the displacement 50. That is, the displacement 50 is the distance between the reference position 29 and the position indicating the peak impact force 47. The displacement acquisition unit 59 stores the center coordinates 49 and the displacement 50 in the evaluation value storage unit 46.

The approximation function calculating unit 61 reads out the impact force distribution 37. The approximation function calculating unit 61 calculates an approximation function 79 for approximating the impact force 36 with respect to coordinates on a straight line passing through the center coordinates 49. Preferably, the approximation function 79 is a single peak and bell-shaped function. The approximation function 79 is, for example, a Gaussian function, a Lorenth function, or a logistic function. The approximation function calculating unit 61 fits the impact force 36 with respect to the coordinates to the approximation function 79 by using the least squares method.

When the peak shape is trapezoidal, the approximation function may be a trapezoidal function. In this case, the displacement acquisition unit 59 calculates the center of the width of the peak portion as the center coordinate 49.

The approximation function 79 may be a function in which X and Y coordinates in a matrix form are used as variables. In this case, the displacement acquisition unit 59 calculates the center of the peak portion of the approximation function 79 using the X and Y coordinates as variables as the center coordinates 49.

Figure 5:
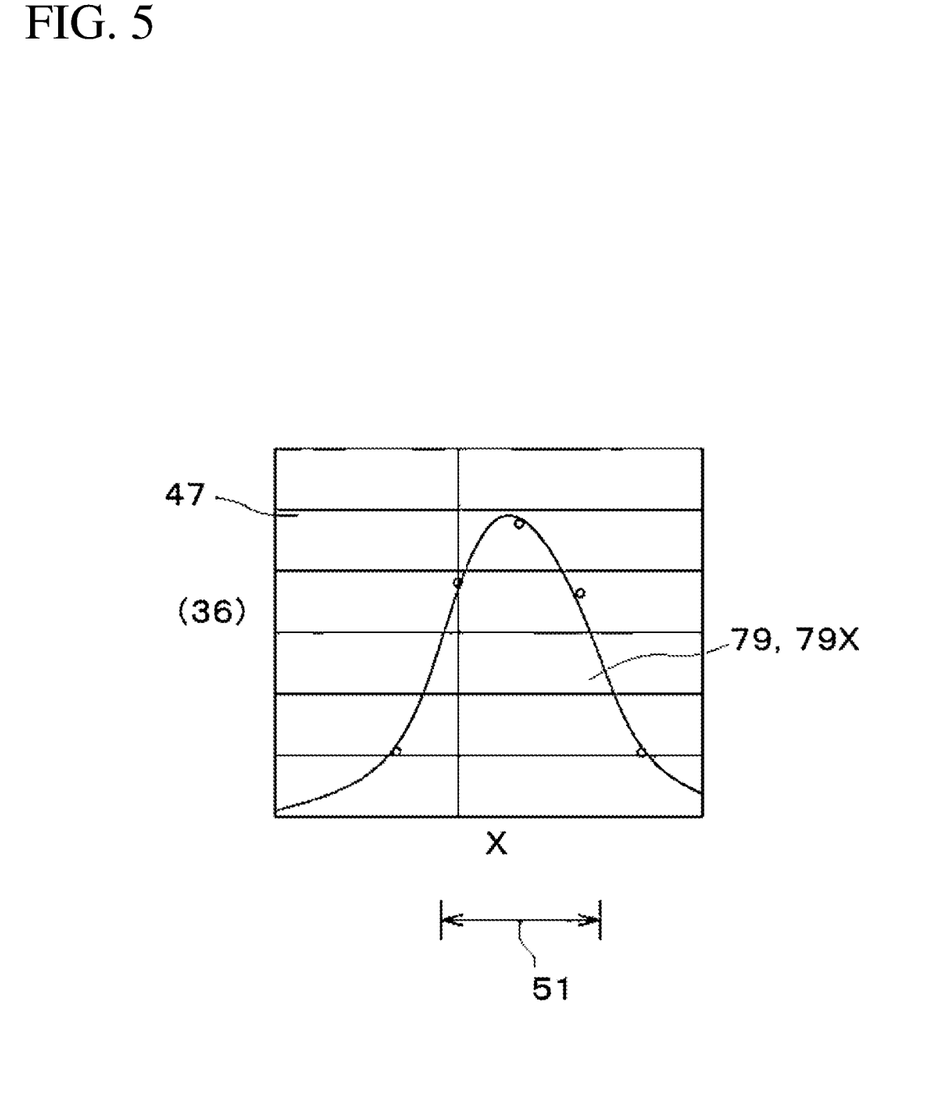
FIG. 5 shows an example of an approximation function and an evaluation width according to the embodiment.

FIG. 5 is an example of a graph in which the impact force 36 and the approximation function 79X detected by the detector 25 on the line 74 passing through the center coordinate 49 and parallel to the X-axis are plotted against the X-coordinate. Further, the approximation function calculating unit 61 calculates an approximation function 79Y of the impact force 36 with respect to the Y coordinate on the line 75 provided in parallel with the Y coordinate passing through the center coordinate 49.

The displacement acquisition unit 59 calculates the center coordinates 49 based on the peak position of the approximation function 79. The displacement acquisition unit 59 sets the peak position of the approximation function 79X as the X coordinate of the center coordinate 49, and sets the peak position of the approximation function 79Y as the Y coordinate of the center coordinate 49.

The evaluation width acquisition unit 63 obtains the evaluation width 51 from the approximation function 79 obtained by the approximation function calculating unit 61. The evaluation width 51 is, for example, an index of the spread of an approximation function such as the half width and the variance $\sigma$. The half width is the full width at half maximum (FWHM) or the half width at half maximum (HWHM). In the case where the approximation function is a Gaussian function, a Lorentz function, or a logistic function, the half width or variance is easily determined from the coefficient of the approximation function. Here, the evaluation width acquisition unit 63 sets the evaluation width of the approximation function 79X or the evaluation width of the approximation function 79Y, whichever is wider, as the evaluation width 51. The evaluation width acquisition unit 63 stores the evaluation width 51 in the evaluation value storage unit 46.

The evaluation width is, for example, an adaptive impact force width, which is a width indicating an impact force equal to or greater than the adaptive impact force that is compatible with the work performed by the jet apparatus 10, such as cleaning or deburring.

The peak impact force acquisition unit 57 determines the peak value of the approximation function 79 as the peak impact force 47. Here, the peak impact force acquisition unit 57 sets the peak of the approximation function 79X or the peak of the approximation function 79Y, whichever is higher, as the peak impact force 47.

The integral value acquisition unit 65 calculates the sum total of the impact forces 36 detected by all the detectors 25 of the impact force distribution 37 as an integral value 53. The integral value acquisition unit 65 stores the integral value 53 in the evaluation value storage unit 46.

The contour line calculation unit 62 calculates the contour of the range in which the adaptive impact force or more is recorded as the contour line 48. In FIG. 4, the adaptive impact force is set to 10 MPa, and a line connecting the centers of the detectors 25 on which 10 MPa or more is recorded is set as a contour line 48. The contour line calculation unit 62 records the contour line 48 in the storage device 35.

The contour line calculation unit 62 may calculate an approximation function 79 on a line parallel to the X-axis for all the Y coordinates, and calculate the contour lines from these approximation functions 79.

The oblateness acquisition unit 64 calculates the long side a and the short side b of the contour line 48. Here, the long side a is the maximum distance between two points taken on the contour line 48. The short side b is the diameter of the largest inscribed circle of the contour line 48. The oblateness 52 is calculated based on the following equation. The oblateness acquisition unit 64 stores the oblateness 52 in the storage device 35.

$$\text{(Flatness 52)}=1-b/a \qquad \text{Equation 1:}$$

The evaluation unit 67 compares the evaluation value with the threshold value to determine whether or not the jet flow 19 and the nozzle 13 are adaptive and the cause of the abnormality of the nozzle 13. The evaluation unit 67 determines that the nozzle 13 is adaptive when (1) the peak impact force 47 is equal to or greater than the minimum peak impact force 39, and (2) the displacement 50 is equal to smaller than the maximum displacement 41. The evaluation unit 67 may determine that the nozzle 13 is adaptive when (3) the evaluation width 51 is equal to or smaller than the maximum evaluation width 43 in addition to the above-mentioned conditions (1) and (2). The evaluation unit 67 may determine that the nozzle 13 is defective when any one of the above-mentioned conditions (1) to (3) is not satisfied.

The evaluation unit 67 determines that the nozzle wear occurs when at least any one of the following conditions are satisfied; (A) the peak impact force 47 is less than the minimum peak impact force 39, (B) the evaluation width 51 is greater than the maximum evaluation width 43, or (C) the oblateness 52 is greater than the maximum oblateness 44.

The evaluation unit 67 determines that the nozzle is clogged when (D) the integral value 53 is less than the minimum integral value 45.

Figure 6:
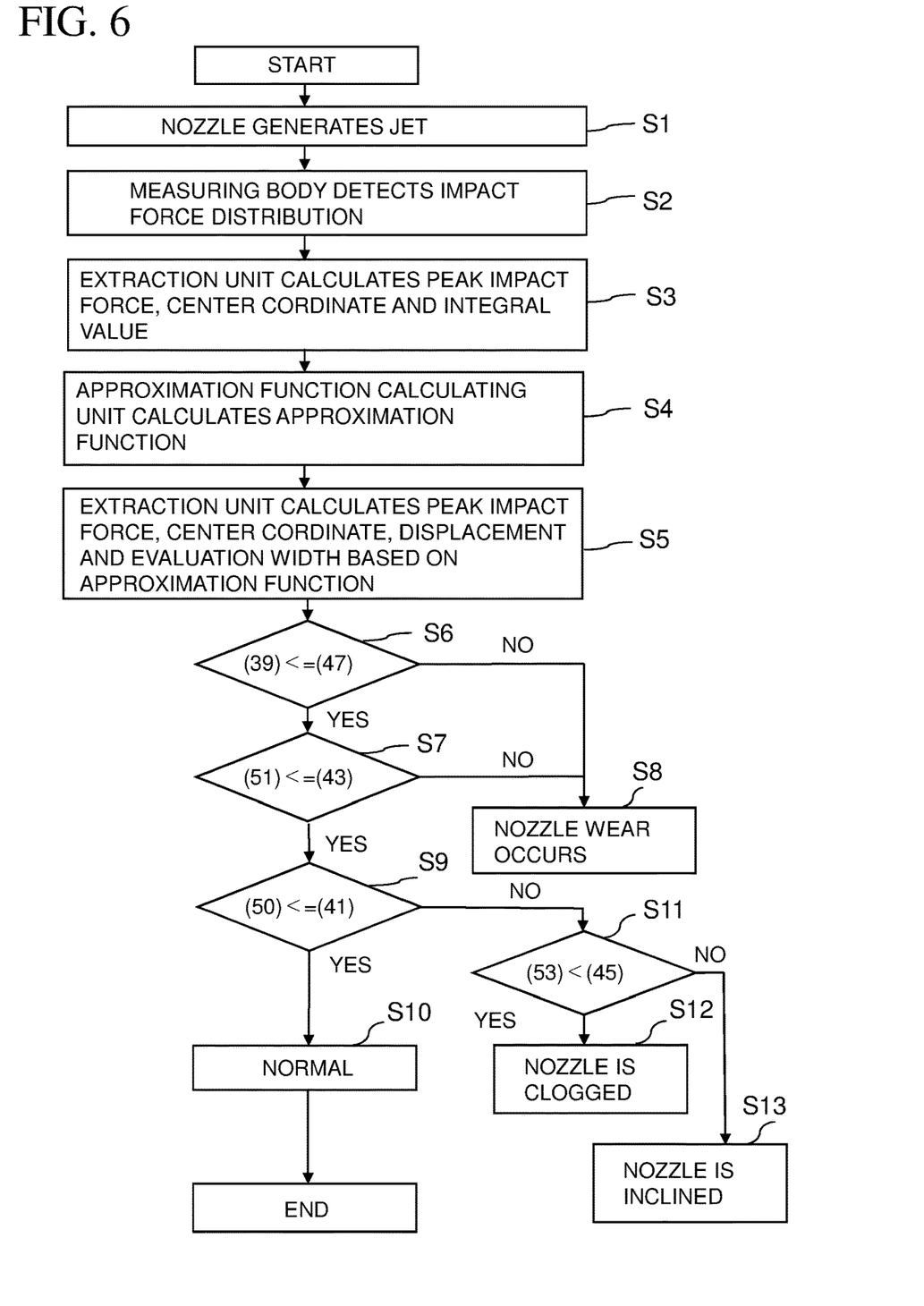
FIG. 6 shows a flowchart of the jet determination method according to the embodiment.

Referring to FIG. 6, a method of evaluating the jet flow 19 will be described. The pressure generator 11 boosts the pressure of the liquid. The nozzle 13 generates a jet flow 19 in step S1. The impact force 36 received by the measuring body 21 from the jet flow 19 is detected. The measuring unit 33 generates the impact force distribution 37 in step S2. The peak impact force acquisition unit 57 acquires the peak impact force 47 based on the impact force distribution 37. The displacement acquisition unit 59 acquires the center coordinates 49 based on the impact force distribution 37. The integral value acquisition unit 65 calculates the integral value 53 based on the impact force distribution 37 in step S3.

The approximation function calculating unit 61 calculates the approximation functions 79, 79X, and 79Y based on the impact force distribution 37 in step S4. The peak impact force acquisition unit 57, the displacement acquisition unit 59, and the evaluation width acquisition unit 63 calculate the peak impact force 47, the center coordinate 49, the displacement 50, and the evaluation width 51 based on the approximation functions 79X and 79Y. The peak impact force acquisition unit 57 and the displacement acquisition unit 59 replace the peak impact force 47 and the center coordinate 49 acquired in step S3 with numerical values obtained by calculation in step S5.

The evaluation unit 67 compares the peak impact force 47 with the minimum peak impact force 39. In step S6, if the peak impact force 47 equals to or more than the minimum peak impact force 39, it proceeds to step S7. Otherwise, it proceeds to step S8.

The evaluation unit 67 compares the evaluation width 51 with the maximum evaluation width 43. In step S7, if the evaluation width 51 equals to or less than the maximum evaluation width 43, it proceeds to step S9. Otherwise, it proceeds to step S8. In step S8, the evaluation unit 67 determines that the nozzle wear is abnormal. Next, the evaluation unit 67 compares the displacement 50 with the maximum displacement 41. In step S9, if the displacement 50 equals to or less than the maximum displacement 41, it proceeds to step S10. Otherwise, it proceeds to step S11.

The evaluation unit 67 compares the integral value 53 with the minimum integral value 45. In step S11, if the integral value 53 is less than the minimum integral value 45, it proceeds to step S12. Otherwise, it proceeds to step S13.

In step S10, the evaluation unit 67 determines that the nozzle 13 is normal. In step S12, the evaluation unit 67 determines that the nozzle is clogged. In step S13, the evaluation unit 67 determines that the nozzle is inclined.

Note that steps S5, S7, or S11 to S13 may be omitted. When step S5 is omitted, in step S3, the displacement acquisition unit 59 determines the displacement 50 based on the impact force distribution 37. When steps S11 to S13 are omitted, and when the condition of step S9 is not satisfied, the evaluation unit 67 determines that the nozzle 13 is defective.

Next, the industrial applicability and the effect will be described. An apparatus for cleaning or deburring a milled or drilled part by applying a high-pressure water jet is used (for example, Japanese Patent Nos. 6147623 and 6227496). In order to perform cleaning or deburring using such a cleaning apparatus, it is necessary to accurately apply the jet flow to the inside or the edge of the hole. In addition, when the impact force received by the foreign matter or burr on the object is lowered, the cleaning or deburred ability is lowered. The jet apparatus 10 according to the present embodiment can be suitably used for the above-mentioned cleaning device. According to the jet apparatus 10 of the present embodiment, it is possible to detect the deterioration of the ability of cleaning or deburring due to the inclination or disturbance of the jet 19 of the cleaning apparatus.

Since the jet apparatus 10 has the measuring body 21 in which a plurality of detectors 25 are arranged in a lattice pattern, and the measuring body 21 has the reference position 29 at a position corresponding to the reference position 17, the state of the jet 19 can be quickly detected as the impact force distribution 37.

Since the measuring body 21 has the protection plate 27, it is possible to prevent the detector 25 from being damaged by the water hammer phenomenon caused by the collision of the jet flow 19 or the wedge effect of the jet 19. Since the protection plate 27 has flexibility to be elastically deformed by the impact force 36 of the jet flow 19, the protection plate 27 can be elastically deformed to transmit the impact force 36 to the detector 25. By the above-mentioned action and effect, the measuring body 21 can measure the state of the jet flow 19 as the impact force distribution 37.

The extraction unit 55 extracts the peak impact force 47, the displacement 50 and the evaluation width 51, and the evaluation unit 67 compares these evaluation values with the minimum peak impact force 39, the maximum displacement 41 and the maximum evaluation width 43, respectively, to determine whether or not the nozzle 13 is adaptive. The evaluation unit 67 can determine the rectilinearity of the jet 19 and the flow velocity of the center portion based on the peak impact force 47 and the evaluation width 51. The evaluation unit 67 can determine the inclination of the jet flow 19 based on the displacement 50.

When the spout 15 is clogged, the total impact force 36 given by the jet 19 decreases. Since the extraction unit 55 has the integral value acquisition unit 65, and the evaluation unit 67 compares the integral value 53 with the minimum integral value 45, the evaluation unit 67 can determine clogging of the nozzle 13.

When the spout 15 is worn, the peak impact force 47 decreases or the jet flow 19 loses its rectilinearity and spreads. Since the evaluation unit 67 compares the peak impact force 47 with the minimum peak impact force 39, and the evaluation unit 67 compares the evaluation width 51 with the maximum evaluation width 43, respectively, the wear of the nozzle 13 can be determined.

In some cases, the center of the jet flow 19 is located at an intermediate position between the plurality of detectors 25. The extraction unit 55 has an approximation function calculating unit 61, and thus the peak impact force 47, the center coordinate 49, and the evaluation width 51 are calculated based on the approximation function 79. Accordingly, an evaluation value adapted to the actual state of the jet flow can be obtained regardless of the center position of the jet 19.

When the spout is worn, the jet flow 19 may flatten out and be jetted. The extraction unit 55 has the contour line calculation unit 62 and the oblateness acquisition unit 64, and the evaluation unit 67 compares the oblateness 52 with the maximum oblateness 44, thus the state of nozzle wear can be determined in the case where the jet flow 19 spreads flattened.

Instead of the displacement 50, an amount of inclination of the jet flow 19 with respect to the axis 16 can be used. The amount of inclination is a quotient obtained by dividing the displacement 50 by the distance between the reference position 17 and the reference position 29. At this time, the maximum amount of inclination can be used instead of the maximum displacement 41. Then, the extraction unit 55 calculates the amount of inclination.

The threshold storage unit 38 can store an intermediate value at which a warning can be generated as a threshold value. At this time, the evaluation unit 67 can compare the intermediate value with the evaluation value to generate a warning.

The present invention is not limited to the embodiments described above, and various modifications can be made without departing from the gist of the present invention, and all technical matters included in the technical idea described in the claims are the object matter of the present invention. While the foregoing embodiments illustrate preferred examples, those skilled in the art will appreciate that various alternatives, modifications, variations, or improvements may be made in light of the teachings disclosed described herein and are within the scope of the appended claims.

REFERENCE SIGNS LIST

10 Jet apparatus
11 Pressure generator
13 Nozzle
16 Axis
17 Reference position (injection position reference position)
21 Measuring body (impact force distribution measuring body)
23 Substrate
25 Detector (impact force detector)
27 Protector plate
29 Reference position (measurement reference position)
31 Controller
79, 79X, and 79Y approximation functions

What is claimed is:

1. A jet apparatus, comprising:
a nozzle having an injection reference position, the nozzle configured to generate a liquid jet;
an impact force distribution measuring body including
a measurement reference position corresponding to the injection reference position, and a plurality of impact force detectors arranged in a lattice pattern on a plane, each impact force detector configured to detect an impact force per unit area of the jet; and a control device including
a threshold storage unit configured to store a threshold,
an impact force distribution measuring unit configured to measure an impact force distribution based on the impact force detected by the impact force detectors when the jet collides with the impact force distribution measuring body,
an evaluation value extraction unit configured to extract an evaluation value based on the impact force distribution, and
an evaluation unit configured to determine whether or not the nozzle is adaptive based on comparison result of the evaluation value and the threshold, wherein the evaluation value includes
a peak impact force that is a maximum impact force in the impact force distribution, and
a displacement that is a distance between the measurement reference position and the position of detecting the peak impact force, the threshold includes
a minimum peak impact force that is a minimum value of the peak impact force, and
a maximum displacement that is a maximum value of the displacement, the evaluation value extraction unit includes
a peak impact force acquisition unit configured to acquire the peak impact force, and
a displacement acquisition unit configured to determine the displacement, and the evaluation unit determines that the nozzle is adaptive when the peak impact force is equal to or greater than the minimum peak impact force, and the displacement is equal to smaller than the maximum displacement, and otherwise the evaluation unit determines that the nozzle is defective.

2. The jet apparatus according to claim 1, wherein the impact force distribution measuring body includes a protection plate covering the plurality of impact force detectors, the protection plate being deformable with respect to the impact force by the jet.

3. The jet apparatus according to claim 1, wherein
the evaluation value extraction unit includes an approximation function calculating unit configured to calculate an approximation function for approximating the impact force on a straight line passing through the position on which the peak impact force is detected,
the displacement acquisition unit configured to extract a distance between a peak position of the approximation function and the measurement reference position as the displacement, and
the peak impact force acquisition unit configured to calculate a peak value of the approximation function as the peak impact force.

4. The jet apparatus according to claim 3, wherein
the evaluation value includes an evaluation width that is an index of the spread of the approximation function,
the threshold includes a maximum evaluation width that is a maximum value of the evaluation width,
the evaluation value extraction unit includes an evaluation width acquisition unit configured to calculate the evaluation width, and
the evaluation unit determines that the nozzle is adaptive when the evaluation width is equal to or smaller than the maximum evaluation width, and otherwise the evaluation unit determines that the nozzle is defective.

5. The jet apparatus according to claim 1, wherein
the evaluation value extraction unit includes an approximation function calculating unit configured to calculate an approximation function for approximating the impact force detected by the impact force detectors,
the displacement acquisition unit configured to extract a distance between a peak position of the approximation function and the measurement reference position as the displacement, and
the peak impact force acquisition unit configured to calculate a peak value of the approximation function as the peak impact force.

6. The jet apparatus according to claim 5, wherein
the evaluation value includes an evaluation width that is an index of the spread of the approximation function,
the threshold includes a maximum evaluation width that is a maximum value of the evaluation width,
the evaluation value extraction unit includes an evaluation width acquisition unit configured to calculate the evaluation width, and
the evaluation unit determines that the nozzle is adaptive when the evaluation width is equal to or smaller than the maximum evaluation width, and otherwise the evaluation unit determines that the nozzle is defective.

7. The jet apparatus according to claim 1, wherein
the evaluation unit determines that the nozzle wear occurs when either the peak impact force is less than the minimum peak impact force or the evaluation width is greater than the maximum evaluation width.

8. The jet apparatus according to claim 1, wherein
the evaluation value includes an integral value that is a sum of the impact force,
the threshold includes a minimum integral value that is a minimum value of the integral value,
the evaluation value extraction unit includes an integral value acquisition unit configured to calculate the integral value, and
the evaluation unit determines that the nozzle is clogged when the integral value is less than the minimum integral value.

9. The jet apparatus according to claim 1, wherein
the evaluation value includes a oblateness of a contour line that is a boundary of region where the impact force equal to or greater than an adaptive impact force is detected,
the threshold includes a maximum oblateness that is a maximum value of the oblateness,
the evaluation value extraction unit includes
a contour line calculation unit configured to calculate the contour line based on the impact force distribution, and
an oblateness acquisition unit configured to calculate the oblateness based on the contour line, and
the evaluation unit determines that the nozzle wear occurs when the oblateness is greater than the maximum oblateness.

10. A method of evaluating a jet, comprising;
generating the jet from an injection reference position of a nozzle;
measuring an impact force distribution based on an impact force per unit area of the jet when the jet collides with a plurality of impact force detectors;
extracting, by an evaluation value extraction unit, a peak impact force and a center coordinate, the peak impact force being a maximum impact force in the impact force distribution, the center coordinate being a position where the peak impact force is detected with respect to a measurement reference position;

calculating, by an evaluation value extraction unit, an approximation function for approximating the impact force on a straight line passing through the center coordinate;

calculating, by an evaluation value extraction unit, the center coordinate, a displacement that is an absolute value of the center coordinate, and the peak impact force based on the approximation function;

comparing, by an evaluation unit, the peak impact force with a minimum peak impact force that is a minimum value of the peak impact force;

comparing, by the evaluation unit, the displacement with a maximum displacement that is a maximum value of the displacement; and determining, by the evaluation unit, that the nozzle is adaptive when the peak impact force is equal to or greater than the minimum peak impact force, and the displacement is equal to smaller than the maximum displacement.

11. The method of evaluating a jet according to claim 10, further comprising:

calculating, by the evaluation value extraction unit, an evaluation width based on the approximation function;

comparing by the evaluation unit, the evaluation width with a maximum evaluation width that is a maximum value of the evaluation width; and determining, by the evaluation unit, that the nozzle is adaptive when the evaluation width is equal to or smaller than the maximum evaluation width.

12. The method of evaluating a jet according to claim 11, further comprising:

determining, by the evaluation unit, that the nozzle wear occurs when either the peak impact force is less than the minimum peak impact force or the evaluation width is greater than the maximum evaluation width.

13. The method of evaluating a jet according to claim 11, further comprising:

calculating, by the evaluation value extraction unit, an integral value that is a sum of the impact force; and determining, by the evaluation unit, that the nozzle is clogged when the integral value is less than a minimum integral value.

14. The method of evaluating a jet according to claim 11, further comprising:

calculating, by the evaluation value extraction unit, an integral value that is a sum of the impact force; and determining, by the evaluation unit, that the nozzle is clogged when the integral value is less than a minimum integral value.

15. The method of evaluating a jet according to claim 11, further comprising:

calculating, by the evaluation value extraction unit, an oblateness of a contour line that is a boundary of region where the impact force equal to or greater than an adaptive impact force is detected; and determining, by the evaluation unit, that the nozzle wear occurs when the oblateness is greater than a maximum oblateness.

16. The method of evaluating a jet according to claim 10, further comprising:

determining, by the evaluation unit, that the nozzle wear occurs when either the peak impact force is less than the minimum peak impact force or the evaluation width is greater than the maximum evaluation width.

17. The method of evaluating a jet according to claim 10, further comprising:

calculating, by the evaluation value extraction unit, an integral value that is a sum of the impact force; and determining, by the evaluation unit, that the nozzle is clogged when the integral value is less than a minimum integral value.

18. The method of evaluating a jet according to claim 10, further comprising:

calculating, by the evaluation value extraction unit, an oblateness of a contour line that is a boundary of region where the impact force equal to or greater than an adaptive impact force is detected; and determining, by the evaluation unit, that the nozzle wear occurs when the oblateness is greater than a maximum oblateness.

* * * * *